Patented July 4, 1950

2,514,191

UNITED STATES PATENT OFFICE

2,514,191

ANTISTICKING TREATMENT OF VINYL RESINS

George P. Rowland, Fairlawn, and Robert H. Steiner, Clifton, N. J., assignors to The Firestone Tire & Rubber Company, Akron, Ohio, a corporation of Ohio No Drawing. Application June 29, 1946, Serial No. 680,518

5 Claims. (Cl. 260—92.8)

This invention relates to the treatment of vinyl chloride resins to prevent the sticking thereof during milling operations.

A troublesome feature of vinyl chloride based resins is their tendency to cling to the rolls during milling operations, rather than to circulate therearound in an easily strippable band. This behavior is not in itself harmful, nor is it necessarily indicative of any deterioration in the resin, and it is to be distinguished from the sticking which sometimes occurs when a resin has been kept too long on the mill at too high a temperature. However, this normal sticking behavior of vinyl resins seriously hampers the milling operation, making it difficult to fold over the band for the incorporation of various ingredients and also makes it difficult to confine the resins to the center of the rolls. Likewise, it is difficult to remove the final milled batch from the rolls.

Accordingly, it is an object of this invention to provide vinyl chloride based resins which will be free from a tendency to stick to the milling rolls.

Another object is to provide a method for treating vinyl chloride based resins whereby they may be freed from their tendency to stick to the mill rolls.

A further object is to provide such a method which may be carried out in the regular course of manufacture of vinyl chloride based resins.

The above and other objects are secured, in accordance with this invention, by washing granular vinyl chloride based resins with dilute aqueous solutions of suitable surface-active agents, more particularly described hereinbelow. The resin is then, without any further washing, mechanically dewatered and dried. The treated resin does not exhibit the usual objectionable tendency to stick to the rolls during milling, but rather circulates around one of the rolls in a smooth, readily strippable band admirably adapted for compounding, blending and like operations. This is in distinct contrast to the usual commercial vinyl chloride based resins, which adhere tightly to one or both of the mill rolls, rendering the compounding operations very difficult.

The resins which may be treated in accordance with this invention may be any polymers of vinyl chloride, or copolymers thereof with minor proportions (say up to about 35 per cent) of other unsaturated compounds copolymerizable therewith such as vinyl esters on the order of vinyl acetate, vinyl propionate, etc.; other vinyl halides such as vinyl bromide, vinyl iodide or vinyl fluoride; acrylic compounds such as acrylonitrile, methyl methacrylate, etc.; vinylidene chloride; and conjugated unsaturated compounds such as butadiene, chloroprene, isoprene and the like. The polymeric resins treated in accordance with this invention may be of the type prepared by mass or solution polymerization, but preferably they should be of the type prepared in aqueous suspension or emulsion. In the latter case, they will generally contain a substantial amount of surface-active agents carried over from the polymerization process. Wetting agents occluded in this manner do not seem to be available as antisticking agents in accordance with this invention, probably being entrapped in the interior of the granules; moreover, such wetting agents deleteriously affect the color and clarity of products manufactured from the resin. Resins containing surface-active agents carried over from the polymerization should therefore be exhaustively washed with water before being subjected to the treatment of this invention. Such washing will generally be sufficiently complete when the washings exhibit an electrical conductivity about equal to an aqueous solution containing 2 parts per million of sodium chloride. It is understood the resin must be in granular form, i. e., in the powdery, grainy or lentil-like forms in which it is produced by emulsion or suspension polymerization, or must be comminuted to particles of substantially the dimensions of said forms, in order to provide a large surface for the adsorption of the wetting agents.

For a fairly complete catalogue of the comonomers which may be copolymerized as above outlined, in minor proportion with vinyl chloride to yield resin which may advantageously be treated in accordance with this invention, reference may be had to the entries under "Vinylchlorid" on pages 735–737 of Krczil, "Kurzes Handbuch der Polymerisations-Technik, vol. II, Mehrstoff Polymerisation," Edwards Brothers Inc. 1945.

Referring next to the wetting agents which may be employed in the practice of this invention, these may be substantially any usual wetting agents containing one or more fatty carbon chains containing 7 or more carbon atoms and a hydrophilic group other than an alkali metal carboxylate group or a alkali metal sulfate ester group. Wetting agents containing an alkali metal carboxylate group are objectionable in that they impart cloud to the final resinous product, and the sulfate ester radicals render the resinous compositions unduly sensitive to heat during the milling. Aside from these exceptions, almost any amine soaps, such as triethanolamine stearate; alkyl, aryl and alkylated aryl sulfonates; and fatty acid partial esters of hexitan anhydrides and polyoxyalkylene oxide condensates of hexitan anhydrides such as the products disclosed in U. S. Patent No. 2,380,166 may be employed. Likewise, there may be employed other surface-active wetting agents such as the partial fatty glyceride and glycol esters, sulfonated fatty esters and amides and the like.

The wetting agents are employed in the practice of this invention in the form of dilute aqueous solutions, usually containing on the order of .1–.3 per cent of the wetting agent. The granular resin is slurried in such a solution for sufficient time to assure thorough contact of the solution with the resin and to effect adsorption of the wetting agent on the surface of the resins. The resins are then filtered or otherwise mechanically separated from the slurry, and dried without washing. The dried resins may be worked and compounded upon a heated roll mill, and will form thereon a readily strippable band greatly facilitating the compounding, blending and breaking down operations to be conducted thereon.

Without absolute commitment to this theory, it is believed that this improved performance is due to the presence of the wetting agent as a thin, adsorbed film on the surface of the resin granules. It is surmised that this film, being in the first portion of the resin granule to contact the mill rolls, brings about some sort of "conditioning" of the milling surfaces so that the resin does not adhere thereto in subsequent operations. Such an explanation is in line with the fact, above alluded to, that the wetting agents carried over from the polymerization operation, do not seem to bring about, at least in any reliable or readily discernible manner, the excellent results attending the practice of this invention; the wetting agents carried over from the polymerization process are probably entrapped in the interior of the resin granules, and are not available for the anti-sticking function attained by the practice of this invention.

The aqueous solution containing the wetting agent may advantageously contain other ingredients adapted to effect improvements in resin properties. For instance, the solutions may contain minor amounts of heat and light stabilizing agents, which will be deposited upon the resin granules along with the film of wetting agent. These heat stabilizing agents will frequently be of a type not readily water dispersable in the absence of the action of the wetting agents. Although no great quantity of stabilizing agents can be incorporated into the resins in this manner, it has been found that the slight amounts incorporated are of distinct advantage during the drying process, which always heretofore has caused a substantial deterioration in vinyl resins.

With the foregoing discussion in mind there are given herewith detailed examples of the practice of this invention. All parts given are by weight.

EXAMPLE I

*Polymerization recipe*

| | Parts |
|---|---|
| Vinyl chloride | 100, 95, 92.5 or 85 |
| Vinylidene chloride (correspondingly) | 0, 5, 7.5, or 15 |
| Water | 300 |
| Sodium dioctyl sulfosuccinate | 1.5 |
| Potassium persulfate | .75 |
| Sodium hydroxide | .15 |

*Final washing compositions*

| | Parts |
|---|---|
| Na$_2$HPO$_4$ | .1 |
| Wetting agent (triethanolamine stearate, monostearin, sodium dioctyl sulfosuccinate, lauryl mono ester of hexitan or sodium salt of diisopropyl naphthalene sulfonate) | .1 |
| Commercial antioxidant | .1 |
| Water | 100 |

*Final test milling formula*

| | Parts |
|---|---|
| Resin to be tested | 25 |
| Dioctyl phthalate | .6 |
| Commercial stabilizer | .34 |

A series of resins was made up in accordance with the "Polymerization Recipe" using the vinyl and vinylidene chloride in the several proportions 100:0, 95:5, 92.5:7.5 and 85:15 indicated. In each case, the several ingredients were mixed together and sealed up in a bottle, which was placed in an apparatus arranged to repeatedly dip and revolve the bottle in a water bath maintained at 42.5° C. At the end of 15 hours, the latex was removed from the bottle, coagulated by addition of a 10 per cent aqueous solution of sodium acid phosphate, filtered, and washed upon the filter with deionized water until the conductivity of the washings was reduced to that of an aqueous solution containing 2 parts per million of sodium chloride.

A series of "Final Washing Compositions" were made up in accordance with the recipe set forth under that heading, using the different wetting agents listed. Samples of each of the washed resins prepared as described in the preceding paragraph were re-slurried with each of the final washing compositions, agitated for 5 minutes, filtered to remove the mechanically free water, and dried in an oven at 50° C.

A sample of each of the treated resins (20 samples in all—each of the 4 resins containing 100 per cent, 95 per cent, etc. vinyl chloride were treated with each of the 5 wetting agents triethanol amine stearate, monostearin, etc.) was then tested on the mill. In each case, the resin under test was made up into a formulation as indicated under "Final Test Milling Formula" and milled for 20 minutes upon a laboratory roll mill maintained at 280°–300° F. In all cases, the treated resins formed a readily strippable band which circulated around the front roll of the mill, similarly to the behavior of rubber during milling. By way of contrast, samples of commercial resins, and of resins which had been polymerized as above described but which had not been treated with the final washing compositions, became tightly adhered to one or both of the rolls almost immediately upon being placed on the mill.

EXAMPLE II

A granular commercial vinyl resin containing about 85 per cent vinyl chloride and 15 per cent vinyl acetate, apparently produced by a solution process of polymerization, was washed with a .1 per cent aqueous dispersion of triethanolamine stearate, filtered to remove the mechanically removable water, and dried. The resultant treated resin exhibited the same excellent working properties characteristic of the treated resins in the preceding example. A sample of the same commercial vinyl resin, not treated in accordance with this invention, stuck badly upon milling.

From the foregoing general discussion and detailed specific examples, it will be evident that this invention provides vinyl resins having remarkably improved working properties, permitting the ready incorporation of compounding ingredients, smoother blending, having less likelihood of scorching, and being readily removed from the mill when compounding is finished. The process of this invention may be carried out with only minor interference with the customary processes of manufacturing vinyl chloride based resins.

What is claimed is:

1. Process which comprises exhaustively washing with water a granular vinyl chloride based resin precipitated from a latex thereof until the salt concentration in the washings is reduced to a value equivalent, in electrical conductivity, to about 2 parts per million of sodium chloride, the granules of said resin consisting of a vinyl chloride based resin, further washing the vinyl chloride based resin, still consisting of the vinyl chloride based resin, with an aqueous dispersion of a surface-active agent containing a fatty group of at least 7 carbon atoms and being selected from the group consisting of sulfonated fatty succinic esters, fatty amine soaps, alkylated aryl sulfonates, fatty acid partial esters of hexitan anhydrides and polyoxyalkylene condensates of hexitan anhydrides and partial fatty glyceride esters, and drying the washed resin.

2. Process which comprises exhaustively washing with water a granular vinyl chloride based resin precipitated from a latex thereof until the salt concentration in the washings is reduced to a value equivalent, in electrical conductivity, to about 2 parts per million of sodium chloride, the granules of said resin consisting of a vinyl chloride based resin, further washing the vinyl chloride based resin, still consisting of the vinyl chloride based resin, with an aqueous dispersion of triethanolamine stearate, and drying the washed resin.

3. Process which comprises exhaustively washing with water a granular vinyl chloride based resin precipitated from a latex thereof until the salt concentration in the washings is reduced to a value equivalent, in electrical conductivity, to about 2 parts per million of sodium chloride, the granules of said resin consisting of a vinyl chloride based resin, further washing the vinyl chloride based resin, still consisting of the vinyl chloride based resin, with an aqueous dispersion of an alkyl sulfosuccinic ester in which the alkyl groups contain at least 7 carbon atoms, and drying the washed resin.

4. Process which comprises exhaustively washing with water a granular vinyl chloride based resin precipitated from a latex thereof until the salt concentration in the washings is reduced to a value equivalent, in electrical conductivity, to about 2 parts per million of sodium chloride, the granules of said resin consisting of a vinyl chloride based resin, further washing the vinyl chloride based resin, still consisting of the vinyl chloride based resin, with an aqueous dispersion of lauryl monoester of hexitan, and drying the washed resin.

5. Process which comprises polymerizing, in emulsion, a monomer composition based on vinyl chloride, precipitating the latex to yield a granular product consisting of a vinyl chloride based resin, washing the resultant precipitated resin with water until the salt concentration in the washings is reduced to a value equivalent, in electrical conductivity, to about 2 parts per million of sodium chloride, thereafter washing the resin, the granules thereof still consisting of the vinyl chloride based resin, with an aqueous dispersion of a surface-active agent containing a fatty group of at least 7 carbon atoms and being selected from the group consisting of sulfonated fatty succinic esters, fatty amine soaps, alkylated aryl sulfonates, fatty acid partial esters of hexitan anhydrides and polyoxyalkylene condensates of hexitan anhydrides and partial fatty glyceride esters, and drying the washed resin.

GEORGE P. ROWLAND.
ROBERT H. STEINER.

REFERENCES CITED

The following references are of record in the file of this patent:

UNITED STATES PATENTS

| Number | Name | Date |
|---|---|---|
| 2,068,424 | Mark | Jan. 19, 1937 |
| 2,238,956 | Strother | Apr. 22, 1941 |
| 2,245,040 | Mark | June 10, 1941 |
| 2,257,167 | Gerhardt | Sept. 30, 1941 |
| 2,319,852 | Doolittle | May 25, 1943 |
| 2,373,347 | Schoenfeld | Apr. 10, 1945 |
| 2,400,808 | Burns | May 21, 1946 |